Aug. 19, 1930.  R. L. WALRATH  1,773,557
SAW
Filed June 13, 1929
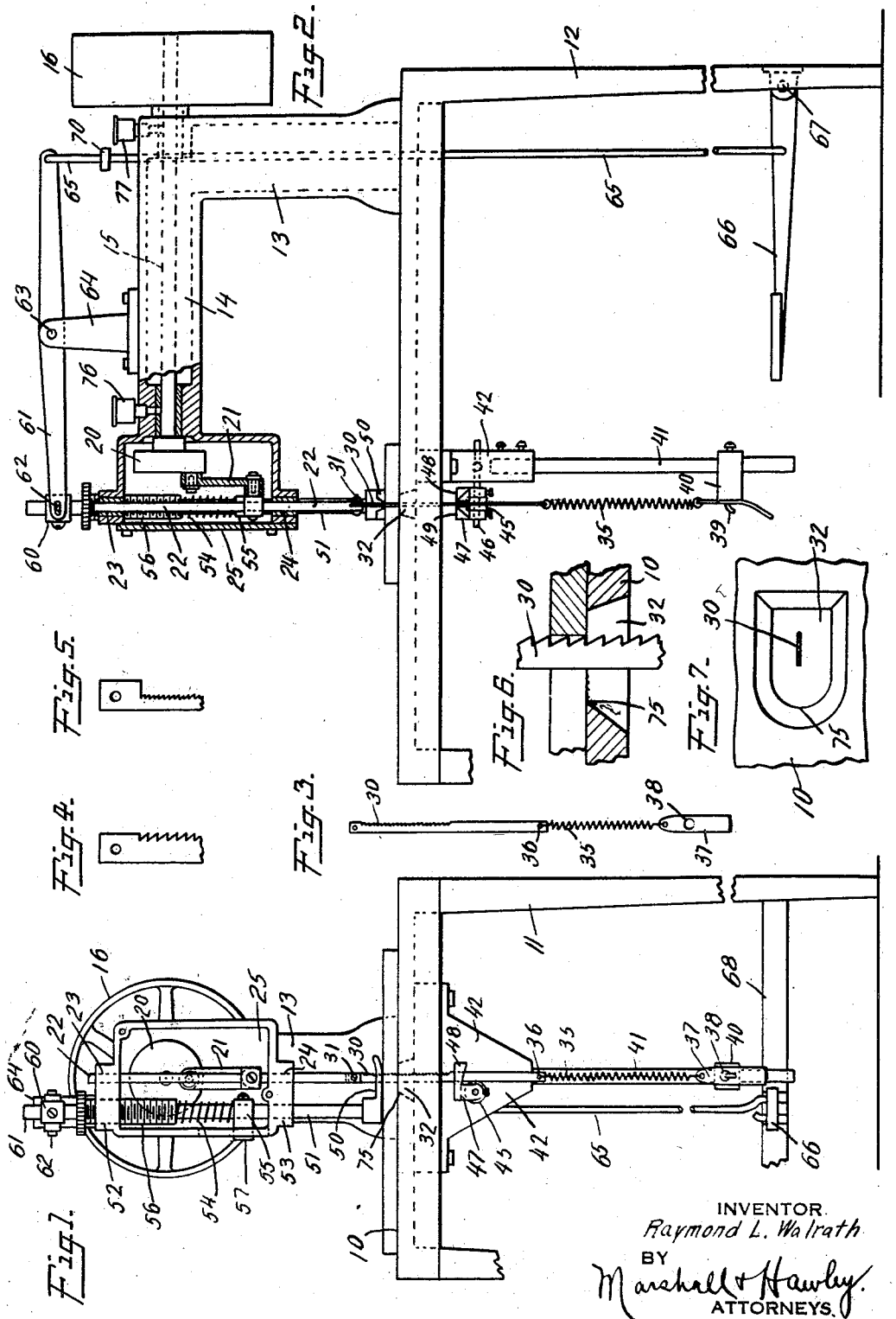
INVENTOR.
Raymond L. Walrath
BY
Marshall & Hawley
ATTORNEYS.

Patented Aug. 19, 1930

1,773,557

UNITED STATES PATENT OFFICE

RAYMOND L. WALRATH, OF SPRINGFIELD GARDENS, NEW YORK

SAW

Application filed June 13, 1929. Serial No. 370,601.

This invention relates to saws and particularly to the type of saw known as a jig saw.

Jig saws as commonly constructed pull the saw blade through the work or article to be sawed and springs are sometimes used to maintain the saw in the plane of the cut and aid in retracting the saw. In this form of construction the spring is tensioned or stretched during the operative or sawing stroke of the saw thus placing an added demand for power on the saw operating mechanism. For this reason there is a material divergence between the amount of power required for the working stroke and the amount of power required for the idle or retracting stroke.

Furthermore, the saw blade has the greatest tendency to deflect or bend as it starts into the work and this tendency decreases as the saw moves through the work. In the pull type of saw above described the spring and blade are under the least tension when the greatest tension is required or, in other words, when the blade is first moving into the work and the tension increases as the demand decreases. This is obviously inefficient. Because of the defects and deficiencies of the pull type of saw above set forth the efficiency of operation of the saw is very materially reduced.

This invention has for its object to provide a jig saw so constructed and operated that the power required for the working stroke and for the retracting stroke will be substantially equalized.

Another object of the invention is to define a jig saw so constructed and so driven that it can be operated at high speeds.

Another object of the invention is to provide a jig saw with a saw table so constructed that the burr or feather edge left on the work by the operation of the saw will be removed as the work is fed over the table.

Another object of the invention is to provide a jig saw, and operating mechanism therefor so constructed and arranged that the operative parts can be easily removed and taken apart.

Another object of the invention is to provide a jig saw, and operating mechanism therefor that is simple and practical in construction and can be economically manufactured.

Further objects of the invention will appear from the following specification taken in connection with the drawings which form a part of this application and in which—

Fig. 1 is an end elevation of a jig saw constructed in accordance with the invention;

Fig. 2 is a front elevation partly in section of the jig saw shown in Fig. 1;

Fig. 3 is an elevational view of the saw blade, tension spring and clip for securing the spring in fixed position at one end thereof;

Fig. 4 is an elevational view partly broken away showing one end of the saw blade;

Fig. 5 is a view similar to Fig. 4 showing a different width of saw blade adapted for use in the jig saw;

Fig. 6 is a sectional elevation through the table showing the knife edge for moving the burr from the work; and Fig. 7 is a bottom plan view of the construction shown in Fig. 6.

The invention briefly described consists of a jig saw comprising a table, a saw blade movable therethrough and means for pushing the saw blade through the work on its cutting or sawing stroke. A spring is secured to one end of the blade for maintaining the blade in a vertical plane and preventing deflection or bending thereof. The jig saw is also provided with a presser foot for holding down the work against the upper surface of the table. The opening through the saw table through which the saw blade reciprocates is provided with a knife edge adapted to shear or cut off the burr or feather edge left on the edge of the work by the saw as the work is pushed or fed across the table. Further details of the invention will appear as the description proceeds.

In the particular form of the invention illustrated there is shown a saw table 10 supported by legs 11 and 12. A hollow casing 13 extends upwardly from the table 10 and has connected to its upper end a substantially horizontal casing or housing 14 through which extends the power or drive shaft 15 by which the saw is operated. The shaft 15 may be driven in any suitable manner as by a pulley 16 which may be connected to any suitable source of power.

A driving disk 20 is secured to the opposite end of the shaft 15 and is connected by a connecting rod 21 to a vertically reciprocatable rod 22 slidably mounted in bearings 23 and 24 carried by a housing 25 which is secured to or formed on the end of the casing or housing 14. The rod 22 is preferably hollow or tubular in construction and has secured to its lower end the saw blade 30. The connection between the blade and the lower end of the rod 22 may be made in any suitable manner as by a bolt or screw 31.

The saw blade 30 extends downwardly through an opening 32 in the table and the lower end of the blade is connected to the upper end of a tension spring 35. The blade 30 has a hole 36 at the lower end thereof through which is passed the upper hooked end of the spring.

The lower end of the spring 35 has secured thereto a clip 37 provided with an opening 38 adapted to receive a hook 39 carried by a block 40 which is adjustably mounted on a post 41 which depends from a bracket 42 secured to the undersurface of the table 10. The rear edge of the saw blade 30 bears against a roller 45 which is rotatably mounted on a spindle 46 carried by the bracket 42. The blade is also guided by a bifurcated block 47 having portions 48 and 49 between which the blade is received. The block 47 is also carried by the spindle 46 and secured thereto on opposite sides of the roller 45.

In order to hold the work down against the upper surface of the table there is provided a bifurcated or forked presser foot 50 which straddles or extends on opposite sides of the saw blade 30 and is carried by the lower end of a rod 51. The rod 51 is slidably mounted in bearings 52 and 53 formed in the housing 25 and the rod is resiliently pressed downwardly by a spring 54 which engages at its lower end a stop collar 55 adjustably secured to the rod 51 and at its upper end engages a sleeve 56 which is adjustably mounted in the upper end of the housing 25. In order to prevent the rod 51 from turning and to maintain the presser foot in the proper alinement the collar 55 has extending rearwardly therefrom a vertical web 57 which is disposed in a slot formed in the rear wall of the housing 25.

The upper end of the rod 51 has secured thereto a block 60 which is connected to the front end of a lever 61 by a pin and slot connection 62. The lever 61 is pivoted at 63 to a pivot bracket 64 carried by the housing 14 and the rear end of the lever is connected by a link 65 to a foot treadle 66 pivotally connected at 67 to a cross frame member 68 connecting the legs 12. A stop collar 70 carried by the link 65 limits the pivotal movement of the lever 61.

As is well known when a block of wood is sawed a burr or feather edge is left on the bottom edge thereof. In order to remove this edge the opening 32 is provided with a sharp edge or knife edge 75 which engages and removes the burr or feather as the work is pushed across the table during the sawing operation. This construction is particularly illustrated in Figs. 6 and 7.

Any suitable lubricating means may be provided, such as oil or grease cups 76 and 77.

Operation

The operation of the saw may be briefly described as follows: When power is applied to the shaft 15 the shaft will be rotated thus reciprocating the rod 22 and pushing the saw downwardly on its operative stroke. The work is fed against the saw manually or if desired by suitable feeding mechanism and will be held during its feeding movement against the upper surface of the saw table by the presser foot 50. The rearward thrust on the saw blade by the work will be taken by the roller 45 and deflection or bending of the blade during its reciprocation is prevented by the spring 35. It will be obvious that the spring will be placed under tension during the up stroke or inoperative stroke of the saw and will be disposed under the greatest tension when the saw is located at this upper extreme position of movement. As the saw moves downwardly through the work the demand for tension thereon to prevent deflection gradually decreases and the tension of the spring also decreases. Furthermore, the downward pull of the spring during the working stroke of the saw assists in pulling the saw through the work as it is pushed by the driving mechanism. As above stated when the material is being fed across the table the knife edge 75 will remove the burr or feather on the lower edge thereof.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. A jig saw comprising a saw blade mounted for reciprocatable movement, reciprocating means connected to the upper end of the blade to force the blade downwardly in its cutting operation and a spring connected to the lower end of the blade for maintaining the blade vertical, said spring being under tension when the blade begins its downward stroke.

2. A jig saw comprising a saw blade mounted for reciprocatable movement, reciprocating means connected to the upper end of the blade to force the blade downwardly in its cutting operation and a spring connected to the lower end of the blade for maintaining the blade vertical, said spring being tensioned on the upward, inactive stroke of the saw blade.

3. A jig saw comprising a saw blade mounted for reciprocatable movement, driving mechanism connected to one end of the saw for pushing the saw through the work operated upon in its operating stroke and a spring connected to the other end of the saw for preventing deflection of the saw, said spring being under tension during the operative push stroke of the saw blade.

4. A jig saw comprising a saw blade mounted for reciprocatable movement, driving mechanism connected to one end of the saw for pushing the saw through the work operated upon in its operating stroke and a spring connected to the other end of the saw for preventing deflection of the saw, said spring being placed under tension on the inactive stroke of the saw and being under tension during the operative stroke of the saw.

RAYMOND L. WALRATH.